United States Patent
Wu et al.

(10) Patent No.: US 8,779,705 B2
(45) Date of Patent: Jul. 15, 2014

(54) SYNCHRONIZATION OF POSITION AND CURRENT MEASUREMENTS IN AN ELECTRIC MOTOR CONTROL APPLICATION USING AN FPGA

(75) Inventors: Long Wu, Fargo, ND (US); Christopher J Tremel, West Fargo, ND (US); Kent D Wanner, Fargo, ND (US)

(73) Assignee: Deere & Company, Moline, IL (US)

( * ) Notice: Subject to any disclaimer, the term of this patent is extended or adjusted under 35 U.S.C. 154(b) by 371 days.

(21) Appl. No.: 13/280,501

(22) Filed: Oct. 25, 2011

(65) Prior Publication Data

US 2012/0217909 A1    Aug. 30, 2012

Related U.S. Application Data

(60) Provisional application No. 61/446,557, filed on Feb. 25, 2011.

(51) Int. Cl.
*H02P 6/00*    (2006.01)
*H02P 6/08*    (2006.01)

(52) U.S. Cl.
USPC .................................. 318/400.09; 318/400.1

(58) Field of Classification Search
CPC ....................................................... H02P 6/00
USPC ............. 318/400.02, 400.04, 400.07, 400.09, 318/400.1, 400.13
See application file for complete search history.

(56) References Cited

U.S. PATENT DOCUMENTS

| | | | |
|---|---|---|---|
| 6,426,602 B1* | 7/2002 | McCann et al. | 318/432 |
| 7,920,954 B2 | 4/2011 | Lejeune et al. | |
| 8,232,751 B2* | 7/2012 | Iwaji et al. | 318/400.02 |
| 8,531,141 B2* | 9/2013 | Wu et al. | 318/400.07 |
| 2011/0006713 A1 | 1/2011 | Wichowski | |

OTHER PUBLICATIONS

Kariyappa, B.S., Hariprasad, S.A., and R. Nagaraji, Position Control of an AC Servo Motor Using VHDL & FPGA, World Academy of Science, Engineering and Technology 49 2009, pp. 1043-1046.

Creating Custom Motion Control and Drive Electronics with an FPGA-Based COTS System, National Instruments, Feb. 2, 2010, Retrieved from the internet <URL:http://zone.ni.com/devzone/cda/tut/p/id/3195>.

Lee, Shiyoung, Ph.D., Application of an Intelligent Motor Controller to the Three-Phase Brushless DC Motor Drives, the Technology Interface/Spring 2010, 9 pages.

* cited by examiner

*Primary Examiner* — Bentsu Ro

(57) ABSTRACT

A system and method for controlling an alternating current (AC) motor using a Field Programmable Gate Array (FPGA) to read the current and position measurements in an the AC motor, perform digital filtering of the position and current data, provide very precise synchronization of the measured phase current and position data, and output the data to a phase converter for control of the AC motor.

17 Claims, 2 Drawing Sheets

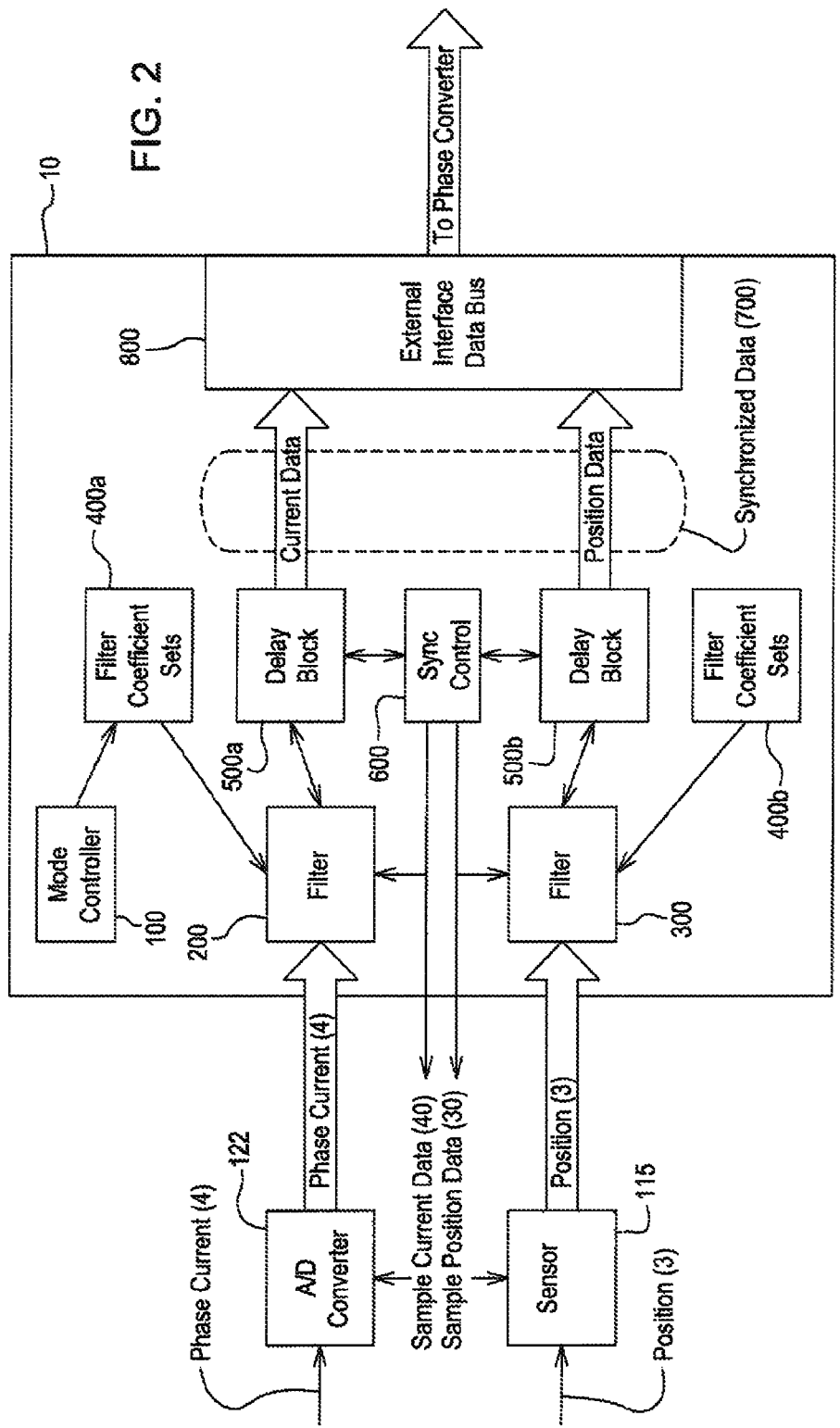

SYNCHRONIZATION OF POSITION AND CURRENT MEASUREMENTS IN AN ELECTRIC MOTOR CONTROL APPLICATION USING AN FPGA

This document claims priority based on U.S. provisional application Ser. No. 61/446,557, filed on 25 Feb. 2011, entitled SYNCHRONIZATION OF POSITION AND CURRENT MEASUREMENTS IN AN ELECTRIC MOTOR CONTROL APPLICATION USING A FPGA, UNDER 35 U.S.C. 119(e).

FIELD OF THE DISCLOSURE

The present disclosure relates to an invention that uses a Field Programmable Gate Array (FPGA) or other type of configurable digital logic to read the current and position measurements in an electric motor, perform digital filtering, and allow for very precise synchronization of measured phase current and position for motor control. It also allows for filter modifications to occur while in operation, allowing for filter properties to change based on machine electrical frequency or pulse-width modulation (PWM) frequency.

BACKGROUND OF THE DISCLOSURE

AC electric motor vector control requires computationally intensive algorithms; this coupled with closed loop control and precise Pulse Width Modulation (PWM) makes vector control a difficult proposition. It has been established that converted motor direct-axis current, id, and quadrature-axis current, iq, of the rotating reference frame must be precisely controlled to provide good dynamic control of the AC motors. When performing AC motor vector control, synchronization of the measured phase currents, ia, ib and ic, with respect to the measured machine electrical position 9 is extremely important. This accurate synchronization is required for optimal machine performance which includes efficiency/output power, as well as to allow for very high speed operation.

In many existing designs the input phase currents and position signals are filtered using analog circuitry, whose delay is subject to tolerances of analog components. In addition to the tolerances, existing analog filtering requires a large number of components, which increases cost and size while reducing overall system reliability. The properties of the filter are also fixed, which lends to different machines requiring different controllers, as well as non-optimal filters used at different machine operating points. This filtered current is usually then fed to a Digital Signal Processor (DSP) which then reads the current and position and performs the synchronization of the phase currents with respect to rotor position. The DSP synchronization accuracy is also limited by the sequential nature of machine code and bandwidth limitations of DSP during operation.

Digital circuitry control schemes are sometimes used for control of AC motors. Digital circuits have the advantage of simple circuitry, software control and flexibility in adaptation to various applications. While digital control circuitry is sometimes used to control AC drives, it, too has limitations. Generating precise PWM gating signals and current control loops require a high sampling, rate to achieve a wide bandwidth performance. The field-programmable gate array (FPGA) is a semiconductor device that can be programmed after manufacturing, and even after a product has been installed in the field—hence the name "field programmable". A FPGA has been used to implement general processing functionality and/or regular AC motor control for permanent magnet (PM) AC motors. However, modern machine uses at high speeds call for more precise synchronization between machine electric position and sensed motor phase current than is currently achieved.

SUMMARY OF THE DISCLOSURE

The present invention uses a FPGA or other type of configurable digital logic to read the current and position, perform digital filtering, and due to the fact that the filter delays are known and very accurate, allows for very precise synchronization of measured phase currents and position for motor control. It also allows for filter modifications to occur while in operation, allowing for filter properties to change based on machine electrical frequency or PWM frequency.

BRIEF DESCRIPTION OF THE DRAWINGS

FIG. 2 is a detailed view of a FPGA as used for control of electric motor phase currents and position synchronization in the present invention.

DESCRIPTION OF THE PREFERRED EMBODIMENT

Figure 1:
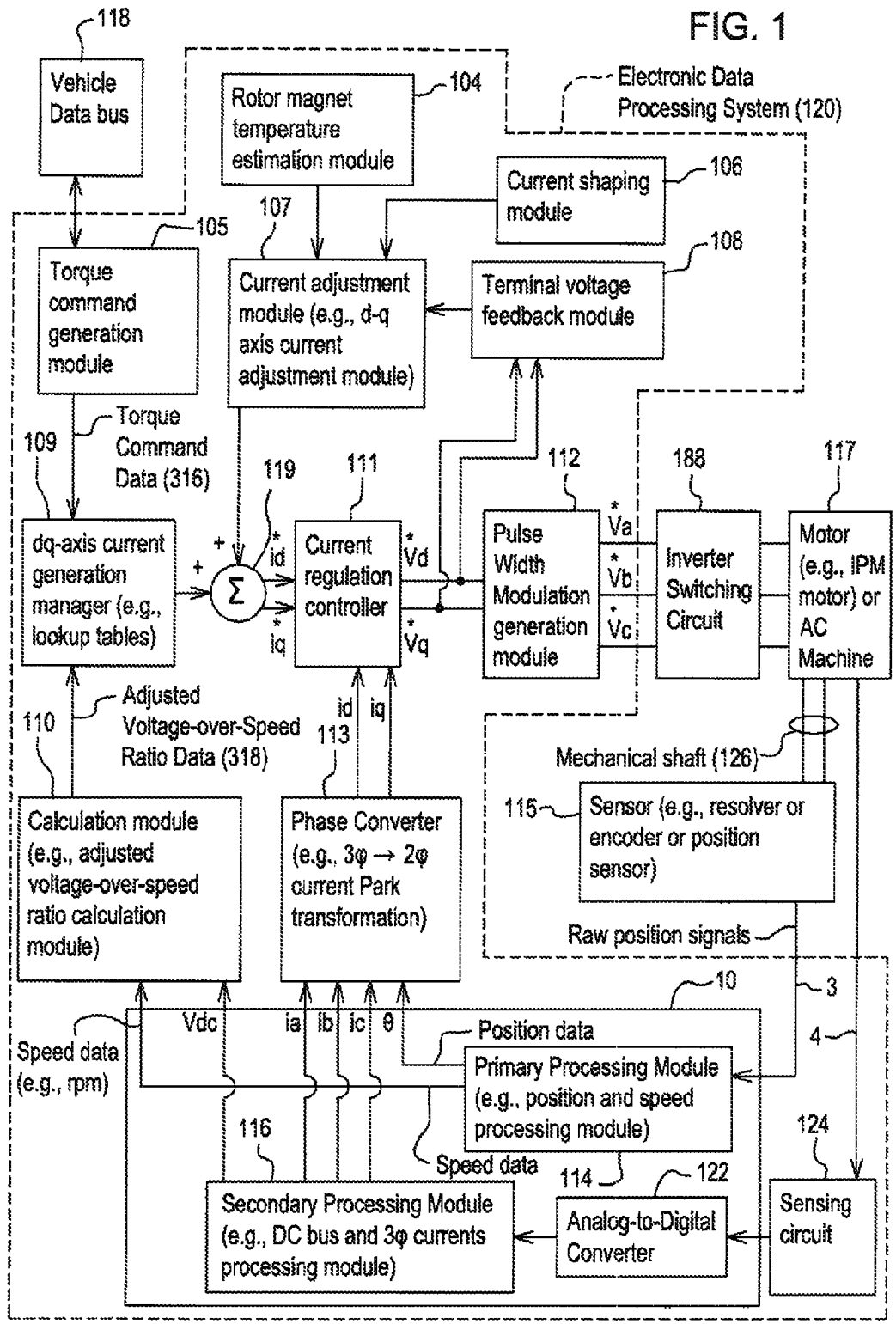
FIG. 1 is a block diagram, of one embodiment of a system for controlling an electrical motor.

In accordance with one embodiment of the present invention, FIG. 1 discloses system for controlling a motor 117 (e.g., an interior permanent magnet (IPM) motor) or another alternating current (AC) machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1. The present invention utilizes one or more Field Programmable Gate Arrays (FPGA) 10 for performing some of the functions of the electronic data processing system 120, and is shown in solid line in FIG. 1

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor that estimates at least one of an angular position of the motor shaft 126, a speed or velocity of the motor shaft 126, and a direction of rotation of the motor shaft 126. The sensor 115 may be mounted on or integral with the motor shaft 126. The sensor 115 and the motor 117 are coupled to the data processing system 120 to provide feedback data (e.g., current feedback data, such as $i_a$, $i_b$, $i_c$), raw position signals, among other possible feedback data or signals, for example. The output of the sensor 115 is capable of communication with the primary processing module 114 (e.g., position and speed processing module). In one embodiment, the sensor 115 may be coupled to an analog-to-digital converter or resolver-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d^*$) and quadrature axis current data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. It can be appreciated, however, that a different number of phases of electrical current can be input or measured. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module of the inverter circuit 118 provides inputs to a driver stage within the inverter circuit 188. An output stage of the inverter circuit 188 provides a pulse-width modulated voltage waveform or other voltage signal for control of the motor. In one embodiment, the inverter 188 is powered by a direct current (DC) voltage bus.

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital (ND) converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. The present invention utilizes one or more Field Programmable Gate Arrays (FPGA) 10 for performing the functions of the Primary Processing Modules 114 and Secondary Processing Module 116. A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current based on the digital three-phase current data from the secondary processing module 116 and position data from the sensor 115. The output of the phase converter 113 module is coupled to the current regulation controller 111. In one embodiment of the present invention, the function of the phase converter 113 is performed by means of a Digital Signal Processor (DSP).

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and terminal voltage feedback module 108 are coupled to or are capable of communicating with the dq-axis current adjustment module 107. In turn, the d-q axis current module 107 may provide current adjustment data to adjust the direct axis current command data and the quadrature axis command data to the summer 119.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

In one embodiment, the motor 117 may comprise an interior permanent magnet (IPM) machine or a synchronous IPM machine (IPMSM). An IPMSM has many favorable advantages compared with conventional induction machines or surface mounted PM machines (SMPM) such as high efficiency, high power density, wide constant power operating region, maintenance free, for instance.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

The present invention utilizes one or more Field Programmable Gate Arrays (FPGA) 10 for performing the functions of the Primary Processing Modules 114 and Secondary Processing Module 116, shown in solid line in FIG. 1. The FPGA 10 is used for detection, filtering and synchronization of phase currents and rotor position. Other functionalities not related to this invention such as hardware protection, fault management, etc. are also implemented in FPGA. Since the phase current information is generally analog information, the analog to digital converter 122 is needed to provide the phase current information to Secondary Processing Module 116 in the FPGA 10 in a form that can be used. It can also be appreciated that the analog-to-digital converter 122, while shown in FIG. 1 as being internal to the FPGA function, can also be external to the FPGA 10. Use of an FPGA 10 with an internal or external A/D converter 122 provides digital logic that eliminates the need for all of the analog control circuitry previously used associated with stator-rotor chopping control, brake chopping, and over-current and over-voltage detection.

FIG. 2 provides a detailed view of how the FPGA 10 is used in the present invention for digital control of the current and position measurements in the electric machine, performing digital filtering, and allowing for very precise synchronization of measured phase current and position for motor control. The FPGA 10 in the electronic data processing system 120 is shown. As shown in FIG. 2, the phase current measurements 4 are fed into the FPGA 10. As previously specified, the phase current measurements are processed through an ND converter 122, which may be external or internal to the FPGA 10. In the arrangement of the present invention shown in FIG. 2, the ND converter 122 is external to the FPGA 10.

Additionally, the position measurements 3 are fed into the FPGA 10 through a sensor 115.

The digitized phase current measurements 4 are fed into a filter 200 in the FPGA 10. The filter 200 is a finite impulse response (FIR) filter. It senses each of the phase currents (3, in this example) at very frequent intervals (i.e. in the range of 1 to 2 microseconds). Each phase of the current has its own FIR filter. Each of the phase FIRs 200 have the same set of filter coefficients 400a, corresponding to a particular machine operating point. When machine operating points vary, the correct filter coefficient sets 400a for that operating point are fed into each filter 200. A mode controller 100 determines the operating mode of the electric machine and selects the correct set of FIR filter coefficients 400a and feeds these selected coefficients to the filter 200 for each phase current being filtered (3, in this example). The correct set of filter coefficients 400a represent the filter impulse response, and enable modification of phase current FIR co-efficients while the system is in operation. Because a FIR filter 200 is of finite duration, as its name implies, the filter settles back to zero in a finite time, allowing for accurate resets and processing of the next data input. It is this finite duration that allows for sensing of the phase currents through the filter 200 at frequent intervals. The time-delay for the FIR filter 200 is fixed, and known at any frequency of current waveform. This allows for precise control of the time delay in current filtering.

The phase current filters 200 receive raw sampled phase currents 4, and FIR filter coefficient sets 400a to perform finite impulse response filtering on the phase currents (3, in this case). The delay block 500a determines the time delay associated with the phase delay resulting from current filtering.

Also as shown in FIG. 2, the position measurements 3 are fed into the position filter 300. The position filtering block 300 (in this example, only one filter) is a finite impulse response (FIR) filter, having similar features described for the phase current FIRs 200, above. It senses the electrical position data 3 at very frequent intervals (i.e. in the range of 1 to 2 microseconds). The position filter receives the raw sampled rotor position data 3, and FIR filter coefficient sets 400b to perform finite impulse response filtering on the rotor position. The delay block 500b determines the time delay associated with the delay resulting from position filtering.

It can be appreciated that the filters 200, 300 can receive varying filter co-efficient sets, provide for the ability to vary data, and allow filter modifications to occur while the system is in operation. The flexible nature of the digital filters 200, 300, allows for filter properties to change based on machine electrical frequency or PWM frequency, or other machine equipment changes that occur in operation. Additionally, use of digital filtering allows for high speed parallel processing of phase currents and positions, providing very accurate synchronization of measured phase current and machine electrical position.

Note that the raw sampled phase currents 4 from analog circuitry may have different sampling rates than the raw sampled rotor position 3 from position sensor or RDC (resolver to digital converter) chip. For this reason, the synchronization control block 600 will provide sample current data 40 to the A/D converter 122, and sample position data 30 to the sensor 115, to control the currents and rotor position sampling rates further fed into the respective filters, 200, 300.

The synchronization control block 600 also evaluates the time delay calculated in delay blocks 500a and 500b and make proper extrapolation of filtered position and/or filtered phase currents such that synchronized rotor position and phase current data is output at 700 and stored in FPGA registers 800. The output of accurate synchronized position/current data at 700 provides for much smoother output to the machine, resulting in optimal machine performance. The external interface 900 is the data bus between the FPGA 10 and other components of the Electronic Data Processing System 120. In particular, the synchronized currents and position data are fed to the Phase Converter 113 upon request. These synchronized currents and position are further processed in Park transformation in the Phase Converter 113 to obtain id and iq. It can be appreciated that the Phase Converter can be part of a Digital Signal Processor (DSP). However, there may be different implementations such as performing the Park Transformation in the FPGA 10 and sending converted id and iq to a Digital Signal Processor (DSP) through the external interface 900.

Having described the preferred embodiment, it will become apparent that various modifications can be made without departing from the scope of the invention as defined in the accompanying claims.

The following is claimed:

1. A method for synchronizing position and current measurements in an alternating current (AC) electric motor control system using at least one field programmable gate array (FPGA), the method comprising:
    at least one digital finite impulse response (FIR) phase current filter in the at least one FPGA receiving, at regular intervals, digitized current information from the AC motor, a set of filter coefficients corresponding to a particular AC motor operating point from a mode controller, and a time delay associated with the phase delay from a first time delay block, the at least one FIR phase current filter outputting filtered current data;
    at least one digital finite impulse response (FIR) position filter in the at least one FPGA receiving, at regular intervals, electrical position measurements from a motor sensor in communication with the AC motor, a set of filter coefficients, and a time delay associated with the delay resulting from position filtering from a second time delay block, the at least one FIR position filter outputting filtered position data;
    at least one synchronization control block in the at least one FPGA evaluating the time delays calculated by the first and second time delay blocks, outputting sampling current data and sampling position data, and synchronizing the outputted filtered position data and outputted filtered current data; and
    the FPGA outputting the synchronized filtered position data and filtered current data to an AC machine control system for controlling the AC motor.

2. The method of claim 1, wherein one digital finite impulse response (FIR) phase current filter is used for each phase of the current from the AC motor.

3. The method of claim 2 wherein each FIR phase current filter is provided the same set of filter coefficients from the mode controller.

4. The method of claim 2 wherein each FIR phase filter is provided the same sampling timing control commands.

5. The method of claim 2, wherein each FIR phase filter is provided the same time delay.

6. The method of claim 1 wherein the synchronized outputted filtered position data and outputted filtered current data is stored in at least one register in the at least one FPGA.

7. The method of claim 1 wherein the digitized current information from the AC motor is processed through an analog to digital converter.

8. The method of claim 7 wherein the analog to digital converter is contained within the at least one FPGA.

9. The method of claim 1, wherein the outputted synchronized filtered position data and filtered current data is delivered to an AC motor phase converter for converting three-phase digital representations of measured current into corresponding two-phase digital representations for controlling operation of the AC motor.

10. A system for operating an alternating current (AC) electric motor by means of using at least one field programmable gate array (FPGA) for synchronizing position and current measurements, the at least one FPGA including:
    at least one digital finite impulse response (FIR) phase current filter capable of receiving digitized phase current data from the AC motor via an analog-to-digital converter;
    a mode controller for providing filter coefficient sets corresponding to a particular AC motor operating point to the at least one FIR phase current filter;
    a first time delay block for providing a time delay associated with the phase delay to the at least one FIR phase current filter;
    at least one digital finite impulse response (FIR) position filter capable of receiving electrical position measurements from a motor sensor in communication with the AC motor, and a set of filter coefficients;
    a second time delay block for providing a time delay associated with the delay resulting from position filtering to the at least one FIR position filter;
    a synchronization control block capable of evaluating the time delays calculated in the first and second time delay blocks, outputting sample current data, and outputting synchronized rotor position and phase current data; and
    at least one register for storing the synchronized rotor position and phase current data.

11. The system of claim 10, further comprising a different digital finite impulse response (FIR) phase current filter for each phase of the current from the AC motor.

12. The system of claim 11 further comprising the mode controller providing the same set of filter coefficients to each FIR phase current filter.

13. The system of claim 11, further comprising the first time delay block provides each FIR phase filter the same time delay.

14. The system of claim 10 wherein the synchronized outputted filtered position data and outputted filtered current data stored in the at least one register is delivered to an external interface data bus.

15. The system of claim 10 wherein the analog to digital converter is contained within the at least one FPGA.

16. The system of claim 15, wherein the synchronized outputted filtered position data and filtered current data is delivered to the external interface data bus is delivered to an AC motor phase converter for converting three-phase digital representations of measured current into corresponding two-phase digital representations for controlling operation of the AC motor.

17. The system of claim 10 further comprising a first FPGA for synchronizing phase current measurements and a second FPGA for synchronizing position measurements.

\* \* \* \* \*